US012799894B2

(12) United States Patent
Berger et al.

(10) Patent No.: US 12,799,894 B2
(45) Date of Patent: Nov. 17, 2026

(54) MODULAR VEHICULAR ENGINE CONSTRUCTION

(71) Applicant: BRP-Rotax GmbH & Co. KG, Gunskirchen (AT)

(72) Inventors: Christian Berger, Meggenhofen (AT); Roland Ennsmann, Gunskirchen (AT); Hermann Neubacher, Taiskirchen (AT); Christoph Stierberger, Linz (AT); Markus Hochmayr, Krenglbach (AT)

(73) Assignee: BRP-ROTX GMBH & CO. KG, Gunskirchen (AT)

(*) Notice: Subject to any disclaimer, the term of this patent is extended or adjusted under 35 U.S.C. 154(b) by 0 days.

(21) Appl. No.: 18/435,586

(22) Filed: Feb. 7, 2024

(65) Prior Publication Data

US 2024/0263577 A1 Aug. 8, 2024

Related U.S. Application Data

(60) Provisional application No. 63/483,640, filed on Feb. 7, 2023.

(51) Int. Cl.

| | |
|---|---|
| ***F02B 75/06*** | (2006.01) |
| ***F01N 13/10*** | (2010.01) |
| ***F02B 75/20*** | (2006.01) |
| ***F02B 75/22*** | (2006.01) |
| ***F02M 35/112*** | (2006.01) |
| ***F02M 35/116*** | (2006.01) |

(52) U.S. Cl.

CPC ............ *F02B 75/06* (2013.01); *F01N 13/107* (2013.01); *F02B 75/20* (2013.01); *F02B 75/22* (2013.01); *F02M 35/112* (2013.01); *F02M 35/116* (2013.01)

(58) Field of Classification Search

CPC .......... F02B 75/06; F02B 75/20; F02B 75/22; F01N 13/107; F02M 35/112; F02M 35/116

See application file for complete search history.

(56) References Cited

U.S. PATENT DOCUMENTS

| | | | | |
|---|---|---|---|---|
| 5,305,656 A * | 4/1994 | Kamiya | ................ | F16F 15/265 123/192.2 |
| 2011/0155083 A1 * | 6/2011 | Sato | ......................... | F02B 75/22 123/90.15 |
| 2020/0232538 A1 * | 7/2020 | Hirano | ................... | F01M 11/02 |

FOREIGN PATENT DOCUMENTS

| | | | |
|---|---|---|---|
| JP | 2017057812 A * | 3/2017 | ................ F01B 1/04 |

* cited by examiner

*Primary Examiner* — Syed O Hasan
(74) *Attorney, Agent, or Firm* — BCF LLP

(57) ABSTRACT

A vehicular engine comprises a crankcase in which a crankshaft is operably disposed and by which a plurality of pistons translate within cylinder blocks operatively coupled to the crankcase. This vehicular engine may have interchangeable cylinder blocks and exhaust manifolds, a balancer shaft disposed below the crankshaft, a balancer gear separably coupled to the crankshaft to engage a front gear of the balancer shaft and supply lubricant to the crank shaft, a separable insert disposed within the crankcase proximal to a con rod of one of the plurality of pistons to supply lubricant thereto, or combinations thereof.

16 Claims, 10 Drawing Sheets

MODULAR VEHICULAR ENGINE CONSTRUCTION

RELATED APPLICATION

This application claims priority to U.S. Provisional Patent Application No. 63/483,640, filed Feb. 7, 2023, the disclosures of which are incorporated herein in their entirety.

FIELD OF THE INVENTION

The present invention relates to the field of vehicular engines, and in particular, the location of components used in the construction and operation of the same to enable increased positioning of the engine within and/or on the vehicle(s) for which they may be intended.

BACKGROUND

As disclosed in U.S. Pat. No. 7,607,958, an exemplary engine may be illustrated with a balancer shaft located above the crankshaft of the exemplary engine. For example, as shown in FIG. 41 of U.S. Pat. No. 7,607,958, a balancer shaft 802 is located above crank shaft 66 and between cylinders 60 of the exemplary engine 10 gearing system 800.

In the position illustrated in U.S. Pat. No. 7,607,958, the balancer shaft 802 and its case 80 result in means to move lubricant to and from the case 80 between cylinder blocks and crank shaft, a configuration to space the engine cylinders further from one another in terms of angular alignment with respect to the crank shaft axis (so as to avoid the balancer shaft and its case), and limitations on placement of the exhaust and air manifold(s) for the engine.

Other engines, such as those disclosed in U.S. Pat. No. 5,960,761, utilize a plurality of balancer shafts disposed about the crank shaft, i.e., balancer shafts 9 and 10 about crank shaft 3 in in FIG. 4 of the aforementioned U.S. patent. In addition to the above-noted issues caused by a balancer shaft located above the crank shaft, the increased number of parts, such as gears and gear trains to allow for proper operation of all the shafts in the gear system unnecessarily increases the number of parts and the need for lubrication and timed engagement of the same.

As a consequence of the above-mentioned issues, there remains an unmet need for oil supply to crankshafts via the balancer shaft. In other words, while others have sought to move the balancer shaft more proximal to the crankshaft, and yet fail to reduce the engine size in the process, they have similarly failed to utilize the balancer shaft for anything other than its previously understood purpose. As such, the art has failed to utilize an engine balancer shaft in a meaningful way, including, supplying lubrication to the crankshaft while it is in operation.

Additionally, in prior engine systems, including multi-cylinder 2-stroke engines, piston rods or con rods do not receive direct oil supply. In state-of-the art systems, lubrication via oil nozzles from outside the crank case is avoided because the oil is fed against centrifugal forces. Further, the bearings of the con rod are only capable of receiving oil when they come into proximity of the external nozzle (e.g., no more than 20° per revolution), limiting the overall lubrication capability of the oil nozzle.

Further additionally, prior engine systems, due to one or more of the above-stated concerns, and others, require mirrored, although not identical, cylinder blocks and cylinder heads. Furthermore, in these prior engine systems, the cylinder block may be integrally formed with the upper portion of the crankcase, requiring more expense in fabrication, repair, and replacement in the event of operation interruptions. Still furthermore, there is heretofore non-existent an engine system comprised of cylinder blocks and cylinder heads that are interchangeable between V-style engine system configurations and those that are inline, e.g., interchangeable cylinder blocks and cylinder heads for use in both a V-6 and an inline-3 engine system.

SUMMARY

An exemplary vehicular engine may comprise a crankshaft configured to rotate about a longitudinal crankshaft axis while being operably mounted in a crankcase, a balancer shaft having an axis of rotation and being operably coupled to the crankshaft and disposed below the crankshaft, and each of a plurality of pistons coupled to the crankshaft via its own con rod whereby each piston is configured to translate along a radial axis extending perpendicularly from the longitudinal crankshaft axis to enable the vehicular engine to generate power. According to this exemplary embodiment of the aforementioned vehicular engine, the radial axis for a first piston of the plurality of pistons defines a first path and the radial axis for a second piston of the plurality of pistons defines a second path, such that the first path and the second path are spaced apart from one another about the longitudinal crankshaft by an angle less than 90°.

In addition to the previously described embodiment and/or as an alternative to any other described exemplary embodiment, the vehicular engine may be configured such that the axis of rotation of the balancer shaft is in a plane that intersects the longitudinal crankshaft axis and substantially bisects the angle $\alpha$.

In addition to the previously described embodiment and/or as an alternative to any other described exemplary embodiment, the angle $\alpha$ may be less than 75°.

In addition to the previously described embodiment and/or as an alternative to any other described exemplary embodiment, the angle $\alpha$ may be about 67°.

In addition to the previously described embodiment and/or as an alternative to any other described exemplary embodiment, the angle $\alpha$ may be less than 75°.

In addition to the previously described embodiment and/or as an alternative to any other described exemplary embodiment, the angle $\alpha$ may be about 67.5°.

In addition to the previously described embodiment and/or as an alternative to any other described exemplary embodiment, the vehicular engine may further comprise at least one cylinder block for translation of at least one of the plurality of pistons along the first path and at least one cylinder block for translation of at least one of the plurality of pistons along the second path, wherein each at least one cylinder block is coupled to an upper portion of the crankcase above the longitudinal crankshaft axis.

In addition to the previously described embodiment and/or as an alternative to any other described exemplary embodiment, the vehicular engine may further comprise an exhaust manifold coupled to the at least one cylinder block.

In addition to the previously described embodiment and/or as an alternative to any other described exemplary embodiment, the exhaust manifold may be disposed at an angle substantially the same as the angle $\alpha$.

In addition to the previously described embodiment and/or as an alternative to any other described exemplary embodiment, the vehicular engine may further comprise an air plenum coupled to the crankcase.

In addition to the previously described embodiment and/or as an alternative to any other described exemplary embodiment, the vehicular engine may be configured such that each of the air plenum and the exhaust manifold extends outwardly from the longitudinal crankshaft axis to a substantially same extent.

In addition to the previously described embodiment and/or as an alternative to any other described exemplary embodiment, the vehicular engine may further comprise a second exhaust manifold disposed in the space in which the angle α is formed between the first path and the second path and operatively coupled to the vehicular engine.

In addition to the previously described embodiment and/or as an alternative to any other described exemplary embodiment, the vehicular engine may be configured such that a center of gravity for the vehicular engine is proximal to a plane that intersects the axis of rotation of the balancer shaft and the longitudinal crankshaft axis and/or a plane that intersects the longitudinal crankshaft axis and substantially bisects the angle α.

In addition to the previously described embodiment and/or as an alternative to any other described exemplary embodiment, the vehicular engine may further comprise a balancer cover disposed below a lower portion of the crankcase and operably coupled thereto.

In addition to the previously described embodiment and/or as an alternative to any other described exemplary embodiment, the vehicular engine may further comprise a balancer gear separable from and operably coupled to the crankshaft and a front gear coupled to the balancer shaft, wherein the balancer gear and the front gear engage one another.

In addition to the previously described embodiment and/or as an alternative to any other described exemplary embodiment, the vehicular engine may be configured such that a lubricant is supplied to a portion of the crankshaft most proximal to the balancer gear via a groove in and a passage through the balancer gear.

In addition to the previously described embodiment and/or as an alternative to any other described exemplary embodiment, the vehicular engine may be configured such that a lubricant is supplied to a portion of the crankshaft distal to the balancer gear and proximal to a con rod via a separable insert operably coupled to the lower portion of the crankcase.

In addition to the previously described embodiment and/or as an alternative to any other described exemplary embodiment, the separable insert for the vehicular engine may receive lubricant from within the crankcase in one direction and transmits it in a substantially orthogonal direction.

In addition to the previously described embodiment and/or as an alternative to any other described exemplary embodiment, the separable insert for the vehicular engine may comprise an insert passage for receiving lubricant from within the crankcase and a nozzle for communicating the lubricant to another portion of the crankshaft, wherein the nozzle communicates the lubricant in a direction that is substantially orthogonal to the passage.

In addition to the previously described embodiment and/or as an alternative to any other described exemplary embodiment, the separable insert for the vehicular engine may consist of a plastic, a rubber, or a combination thereof.

In addition to the previously described embodiment and/or as an alternative to any other described exemplary embodiment, the vehicular engine may be configured such that each cylinder block is identical in construction.

An exemplary vehicular engine may comprise an upper half of a crankcase configured to operatively hold a crankshaft and a plurality of pistons, at least one cylinder block configured to house at least one of the plurality of pistons, and at least one cylinder head configured to operatively couple to the at least one cylinder block, wherein the upper half of the crankcase operates with the at least one cylinder block and the at least one cylinder head as either an inline engine configuration or a V-style engine configuration.

In addition to the previously described embodiment and/or as an alternative to any other described exemplary embodiment, the vehicular engine is configured to be in a V-style engine configuration while each of the at least one cylinder block is identical to the other.

An exemplary vehicular engine balancer gear may be configured to operably couple to a crankshaft of a vehicular engine such that the balancer gear comprises a front surface most distal from a center of the crankshaft, a rear surface most proximal to the center of the crankshaft, and a thickness connecting the front surface to the rear surface. The exemplary vehicular engine balancer gear may also comprise a catch groove in the front surface and a passage from the groove and through the thickness of the balancer gear, wherein the passage opens toward a surface on a web of the crankshaft.

An exemplary vehicular engine insert may comprise a body having a passage for a fluid, a nozzle fluidly coupled to the passage, and a channel through a thickness of the insert, wherein the channel fluidly interconnects the passage to the nozzle so that the nozzle and the passage are substantially orthogonal to one another.

In addition to the previously described embodiment and/or as an alternative to any other described exemplary embodiment, an exemplary vehicular insert may comprise two legs interconnected to a torso, wherein each of the two legs is substantially perpendicular to the nozzle and the two legs interconnect with the torso to form an arched configuration.

In addition to the previously described embodiment and/or as an alternative to any other described exemplary embodiment, an exemplary vehicular engine may comprise therein any of the aforementioned and otherwise disclosed exemplary vehicular inserts.

In addition to the previously described embodiment and/or as an alternative to any other described exemplary embodiment, an exemplary vehicular engine may comprise therein any of the aforementioned and otherwise disclosed exemplary vehicular inserts and dispose the same in a portion of a crankcase and adjacent a con rod coupled to a crankshaft operable coupled there within.

In addition to the previously described embodiment and/or as an alternative to any other described exemplary embodiment, an exemplary vehicular engine may communicate lubricant from within the crankcase to a con rod via an exemplary vehicular engine insert.

Figure 1:
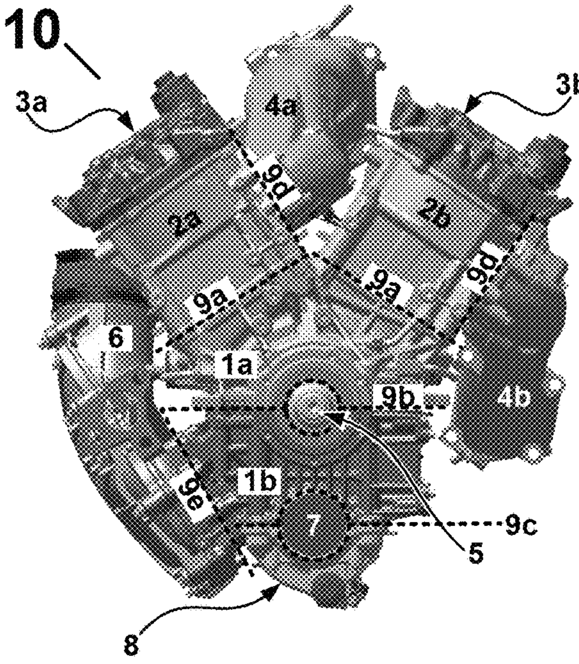
FIG. 1 illustrates an exemplary first face of an engine according to one exemplary embodiment of the inventions disclosed herein.

In the drawings like characters of reference indicate corresponding parts in the different and interchangeable and interrelated figures. Parts and components of each figure may be substitutes for other components in other figures to achieve the various methods and embodiments disclosed herein. Methods and protocols disclosed in any embodiment may be run in any order so as to affect their disclosed goals and/or enable performance of the systems as described. Additionally, any one embodiment may utilize any method or protocol described and in any portions, sequences, and combinations thereof.

DETAILED DESCRIPTION

Figure 2:
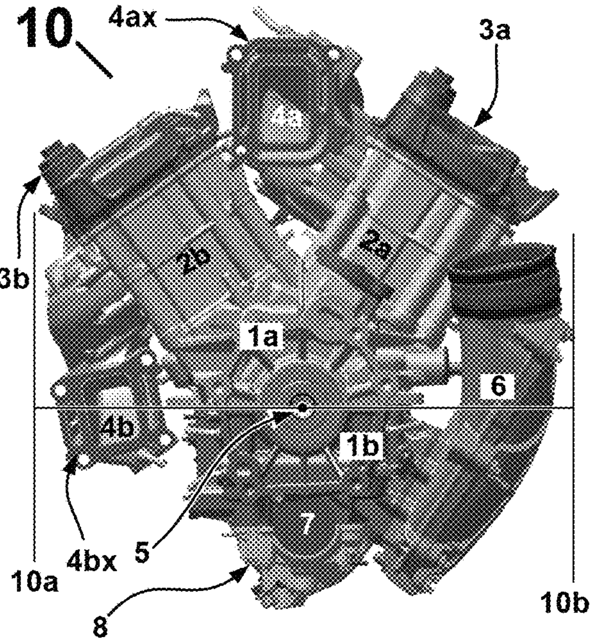
FIG. 2 illustrates an exemplary second face opposite the first face of the engine of FIG. 1 according to one exemplary embodiment of the inventions disclosed herein.

With reference to the illustrative embodiments described herein and illustrated in FIGS. 1-2, an exemplary engine 10 may comprise a crankcase upper portion 1*a* and a crankcase lower portion 1*b* separatable along plane 9*b*, but otherwise coupled to one another using attachments means and mechanisms known to those skilled in the art. Each of crankcase upper portion 1*a* and crankcase lower portion 1*b* may be designed and configured using known methods to permit the disclosed features of the various inventions of this application, including among them, the operable holding of crankshaft 5 therein. In an exemplary embodiment, the portions of crankcase 1*a* and 1*b* that circumscribe crankshaft 5 may be designed so that a longitudinal axis of crankshaft 5 (that is, the major axis along the length of crankshaft 5 as opposed to the radial axes that may extend perpendicularly therefrom in the direction of the one or more con rods of the pistons operably connected to the same) may be found in a plane 9*b*. Distal from the plane 9*b* may be plane 9*a*, which is angularly oriented with respect to the longitudinal axis of crankshaft 5. Like plane 9*b*, plane 9*a* may delineate the plane separating the crankcase upper portion 1*a* from each of the cylinder blocks 2*a* and/or 2*b*, which are coupled with their corresponding cylinder heads 3*a* and 3*b*, respectively. Likewise, plane 9*d* may be angularly oriented with respect to the longitudinal axis of crankshaft 5 in substantially the same arrangement as plane 9*a* and 9*b* or at any other angle so as to provide coupling between an exhaust manifold 4*a* and 4*b* to each of cylinder blocks 2*a* and 2*b*, respectively. In an exemplary embodiment, exhaust manifolds 4*a* and 4*b* couple to cylinder blocks 2*a* and 2*b*, respectively, at an angle that is substantially the same as the angle of the cylinder blocks 2*a* and 2*b* with respect to the longitudinal axis of crankshaft 5. In yet another exemplary embodiment, exhaust manifolds 4*a* and 4*b* may be coupled to cylinder blocks 2*a* and 2*b*, respectively, so that the downstream exhaust opening of one manifold (e.g., manifold exhaust 4*bx* as shown in FIG. 2) lies in a plane perpendicular to the longitudinal axis of the crankshaft 5 and such plane is also intercepted by the downstream exhaust opening of the other manifold (e.g., manifold exhaust 4*ax* as shown in FIG. 2), although at a different position (e.g., an angularly offset position from one another about the longitudinal axis of the crankshaft 5). The crankcase lower portion 1*b* may be separably coupled to a balancer cover 8 along a plane 9*c*, which plane 9*c* may be substantially parallel with plane 9*b*. In similar fashion to upper crankcase portion 1*a* and lower crankcase portion 1*b* vis-à-vis crankshaft 5 longitudinal axis and plane 9*b*, a longitudinal axis of a balancer shaft 7 may be substantially parallel to the longitudinal axis of crankshaft 5, be circumscribed by surfaces in lower crankcase portion 1*b* and balancer cover 8, and be situated so that its longitudinal axis lay in plane 9*c* in substantially vertical alignment with that of the crankshaft 5.

Additionally, an exemplary crankcase lower portion 1*b* may be coupled to an air intake plenum 6 along plane 9*e*. In an exemplary embodiment, an exemplary air intake plenum 6 may occupy substantially the same space bounded by cylinder block 2*a*, crankcase upper portion 1*a*, crankcase lower portion 1*b*, and balancer cover 8 as exhaust manifold 4*b* on the opposite side of engine 10. In an exemplary embodiment, the engine 10 according to the disclosures herein may have radial extents 10*a* and 10*b* extending in opposite radial directions from the longitudinal crankshaft axis and lie along plane 9*b*. An exemplary radial extent 10*a* may be a plane that is perpendicular to plane 9*b* and intersects a distal-most edge of one of cylinder block cover 3*a*/3*b*, cylinder block 2*a*/2*b*, manifold 4*b* (or whichever manifold is located outside of the "v" formed by the cylinder blocks), and/or plenum 6. In a preferred embodiment, radial extent 10*a* may be substantially the same length as radial extent 10*b* when measured from the center (e.g., longitudinal axis) of crankshaft 5 along plane 9*b* (e.g., the plane about which the upper crankcase portion 1*a* and lower crankcase portion 1*b* couple) when plane 9*b* is positioned parallel with the surface of measurement (e.g., the floor or table). Using the same measurement protocol as stated, an exemplary engine 10 may have ratios of radial extent 10*a* to radial extent 10*b* between about 95% and about 105%, between about 98% and about 102%, and most preferably about 100%.

Each of the aforementioned components (1*a*, 1*b*, 2*a*, 2*b*, 3*a*, 3*b*, 4*a*, 4*b*, 5, 6, and 7) and any others required for engine 10 operation in a particular vehicle may be coupled to one another (e.g., along one or more of planes 9*a-e*, or any other portions of the aforementioned components) using attachment mechanisms and techniques known to those skilled in the art (e.g. bolts, brackets, gasket-type connections).

Figure 3:
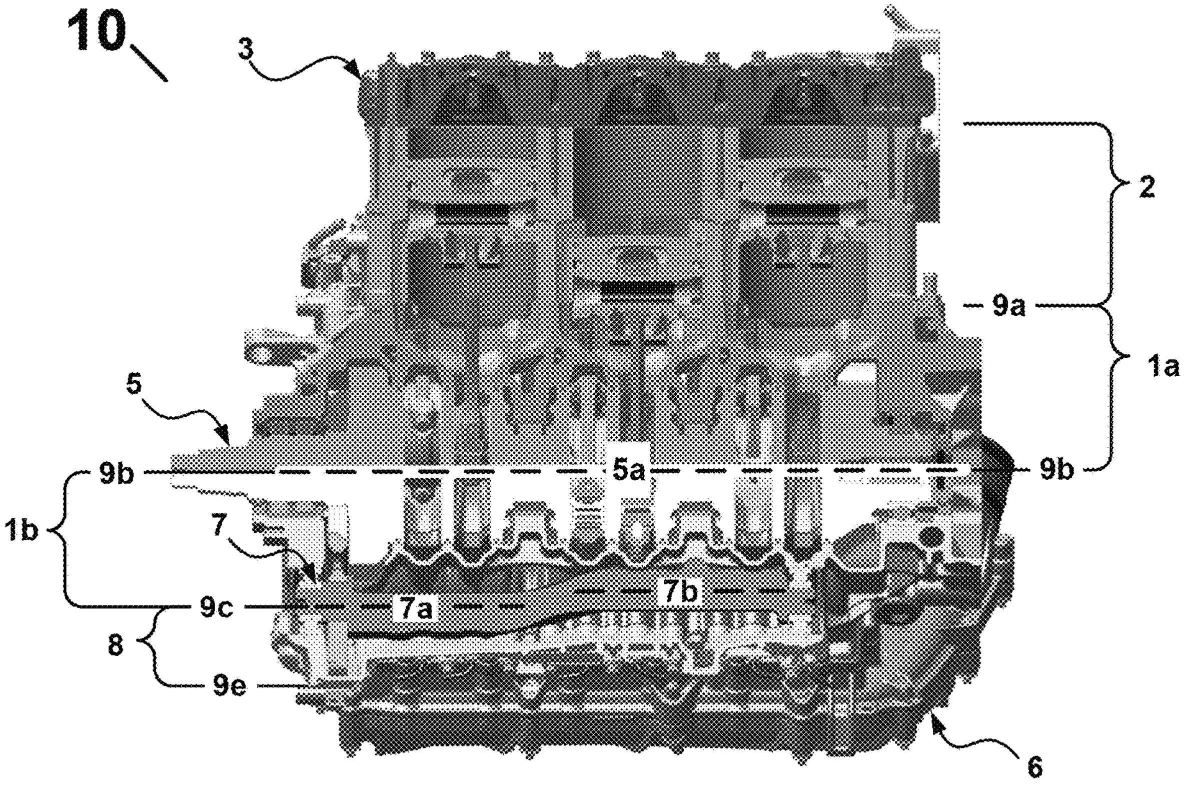
FIG. 3 illustrates a sectioned view of the profile of the exemplary engine of FIGS. 1-2 providing an exemplary embodiment of other aspects of the inventions disclosed herein.
Figure 4:
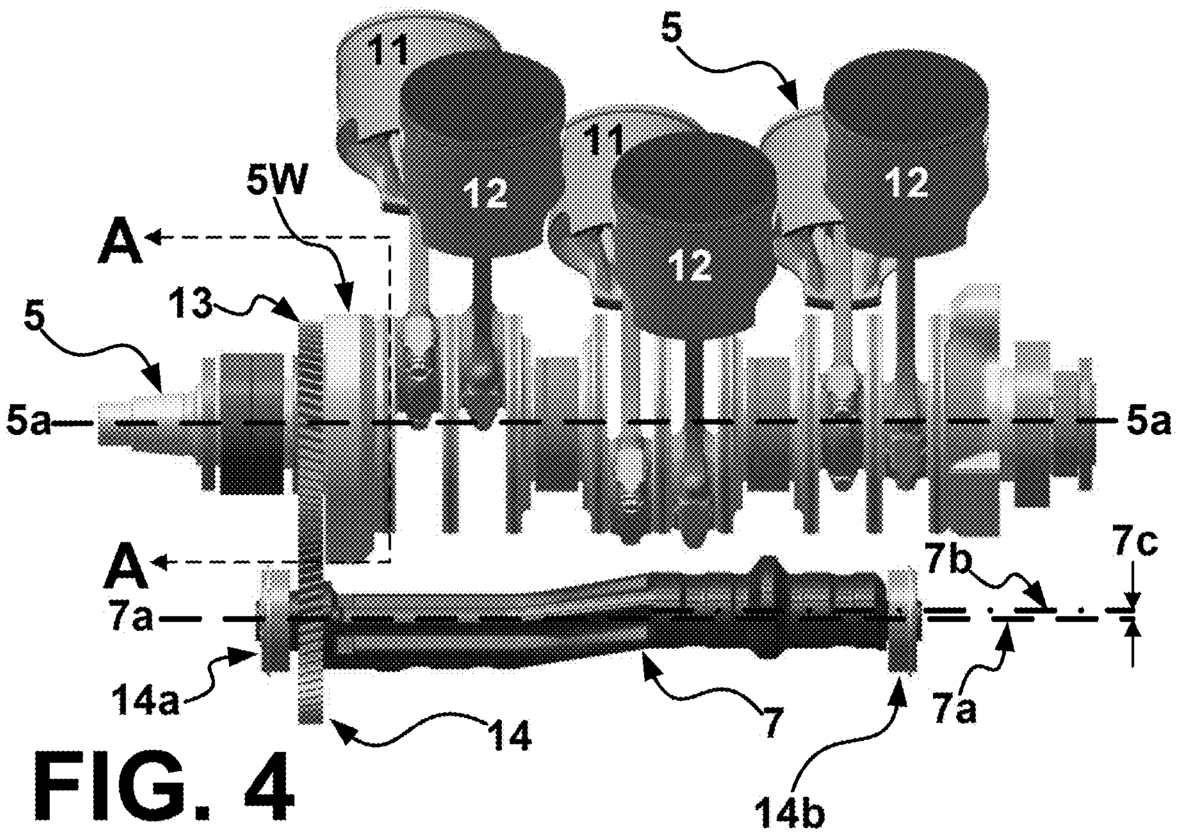
FIG. 4 illustrates an exemplary embodiment of a profile view of the crankshaft, pistons, con-rods, and balancer shaft according to aspects of the inventions disclosed herein.

In accordance with one or more of the teachings herein, the illustrative embodiment provided in FIG. 3 may disclose a profile arrangement of the components identified in FIGS. 1-2. According to FIG. 3, an exemplary longitudinal axis 5*a* may be located along the plane 9*b* illustrated. As further provided for in FIG. 3, an exemplary balancer shaft 7 may have a non-linear arrangement so that it has both a first axis 7*a* arranged along plane 9*c* and a second axis 7*b* offset from the first axis 7*a* by a certain offset 7*c*. Despite the different axes 7*a*/7*b*, balancer shaft 7 has only one axis of rotation in plane 9*c*, which in the illustrative embodiments of FIGS. 3-4 is first axis 7*a*. In a preferred embodiment, an exemplary offset 7*c* between the first axis 7*a* and the second axis 7*b* of the balancer shaft 7 may be between 1% and 8%, more preferably between 3% and 6%, and even more preferably about 4.5% of the distance measured between each axis 7*a* and 7*b* from the longitudinal axis 5*a* of the crankshaft 5 when axis 7*b* is at its closest position to longitudinal axis 5*a*. For example, referencing the illustrative embodiment of FIG. 4, an exemplary axis 7*a* that may be located about 200 mm from the longitudinal axis 5*a* of crankshaft 5 in an exemplary engine may have an exemplary axis 7*b* that is located an exemplary distance 7*c* of 5% may result in axis 7*b* being located a distance that is 190 mm from the longitudinal axis 5*a* of crankshaft 5 when axis 7*b* of balancer shaft 7 is at its most proximal point to longitudinal axis 5*a*. An illustrative example of the degree of offset 7*c* between axes 7*a* and 7*b* of an exemplary balancer shaft 7 as compared to the longitudinal axis 5*a* of an exemplary crank shaft 5 may be further illustrated with reference to FIG. 4. As illustrated, an exemplary axis 7*a* may be shown in (— — —) dashed lines while exemplary axis 7*b* may be shown in (— • — •) dashed lines. Although FIGS. 3-4 may illustrate balancer shaft 7 with offset axes, those skilled in the art may instead use a balancer shaft 7 with no offset, but possess other characteristics and configurations to achieve the engine balancing and other goals thereof.

With continued reference to FIG. 4, an exemplary crankshaft 5 may have a balancer gear 13 configured to mesh with balancer shaft 7 via front gear 14. However, an exemplary balancer shaft 7 may have a front bearing 14*a* and a rear bearing 14*b*. Front and rear bearings 14*a-b* support rotation of balancer shaft 7 within crank case lower 1*b* and balancer cover 8 during operation of engine 10.

In an exemplary embodiment, an exemplary balancer shaft 7 may be located with respect to the crankshaft 5 as described herein to effect a more centralized location for the center of gravity of the vehicular engine 10, which may be located at a point between the top of the crankcase upper 1*a* and the longitudinal crankshaft axis 5*a* from the front to the rear of the vehicular engine 10. Alternatively, the center of gravity may be at any other location about engine 10 to enable stable and symmetrical placement of two such engines 10 on a portion of a frame or body of a vehicle. For example, the center of gravity of an exemplary engine 10 may be such that two such engine 10 may be placed equidistant from the centerline of a watercraft frame such that, when considering the frame and the engines, the moment about the watercraft centerline due to either engine 10 would be substantially the same. Accordingly, designers of vehicles may take advantage of the centralized mass enhancements resulting from the disclosures herein to better design and increase performance of vehicles that incorporate the same.

Figure 4A:
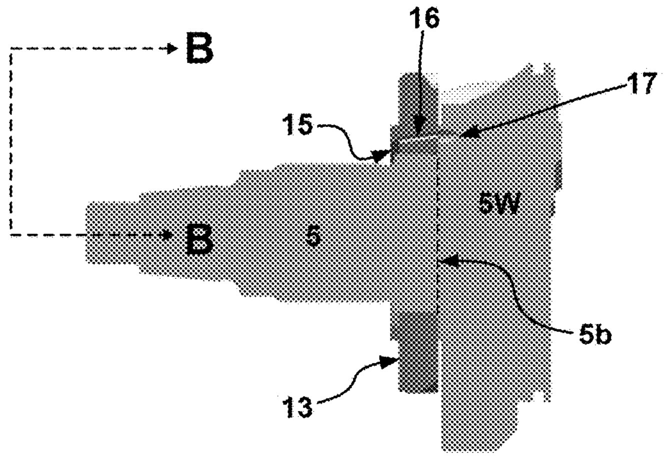
FIG. 4A illustrates an exemplary embodiment of a sectioned view of FIG. 4 along the crankshaft axis and providing further aspects of the inventions disclosed herein.
Figure 4B:
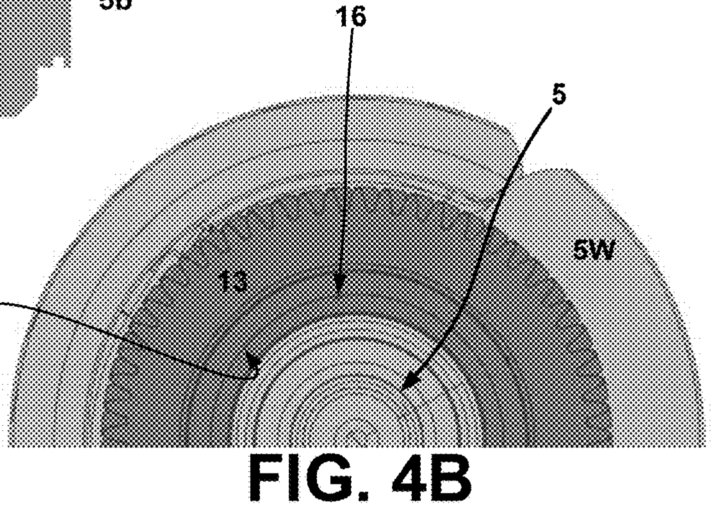
FIG. 4B illustrates an exemplary embodiment of a sectioned view of FIG. 4A along the dashed line marked "B-B" and providing further aspects of the inventions disclosed herein.

With reference to the exemplary sectional views provided for in FIGS. 4A-B, an exemplary crankshaft 5 may be frictionally coupled to balancer gear 13 at a position 5*b* that may separate the cylindrical portions of crankshaft 5 from the remainder making up the crankshaft web 5W. An exemplary position 5*b* may be the position at which the balancer gear 13 may be most proximal to an oil groove 17 in the crank web 5W, which may include direct abutment or other spaced arrangements that facilitate passage of oil through balancer gear 13 to crankshaft web 5W. In an exemplary embodiment, balancer gear 13 may comprise an oil catch groove 15 that may be configured to meter oil received therein to an oil passage 16 that may act as a conduit of oil from one or more sources within the crankcase portions 1*a* and/or 1*b* to the crankshaft web 5W. Thus, an exemplary crankshaft 5 may enable the promotion of lubricants, such as oil, to the immediately most proximal web section 5W via an exemplary balancer gear 13, e.g., crankshaft web portions 5W most proximal to the generator end of crankshaft 5. In alternative embodiments, an exemplary balancer gear 13 located on the power take-off side of crankshaft 5 (e.g., more proximal to the end cylinder 14*b* of balancer shaft 7 illustrated in FIG. 3), may provide the same or similar lubrication capabilities to an opposite extremity of the crankshaft 5. Thus, an exemplary engine 10 gear system may not only provide the motive conduction through its geared engagements, such as between crankshaft 5 and balancer shaft 7, but may simultaneously enable the passage of lubricants to certain parts, such as the generator end or power take-off end, of an exemplary crankshaft 5 and/or proximal sections of crankshaft web 5W thereto with appropriately configured oil grooves 17 machined therein. In other disclosures, use of other features may provide lubricant to portions of the crankshaft web 5W that are more distal to the crankshaft portions depicted in FIGS. 4A-B.

Figure 6:
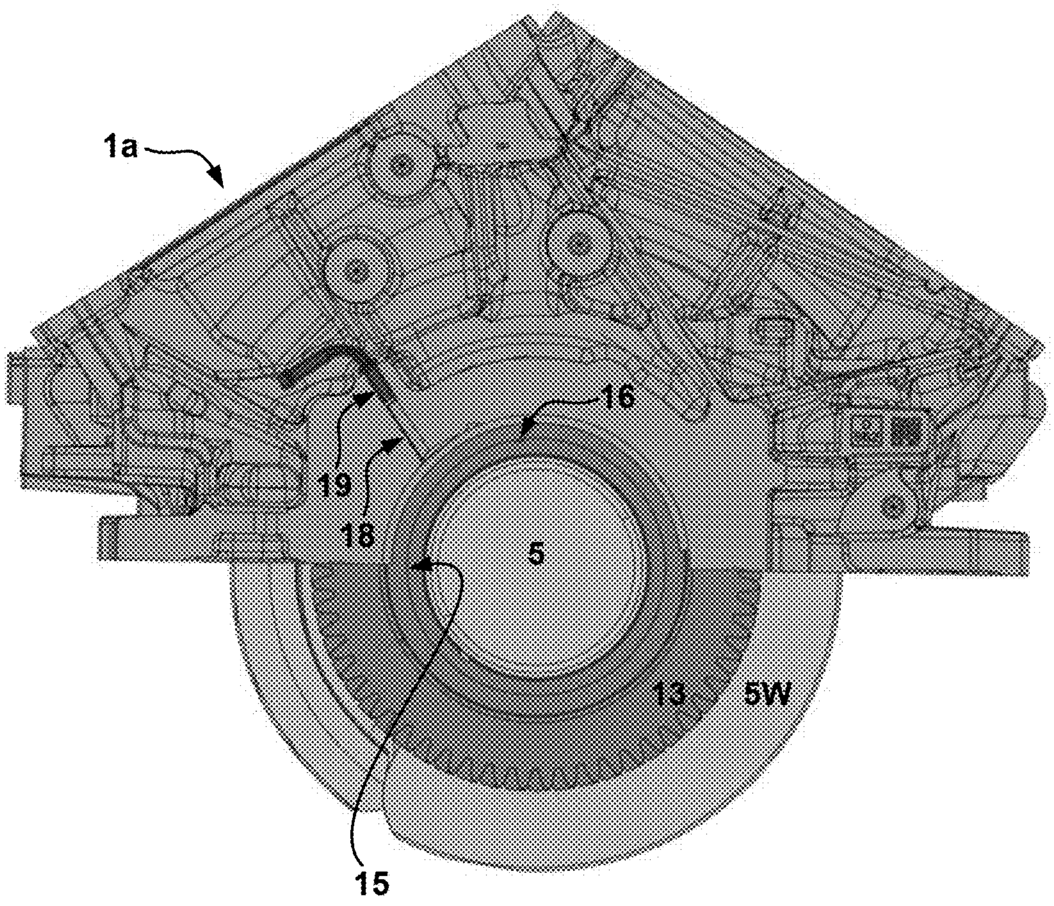
FIG. 6 illustrates an exemplary embodiment of a front-facing view of a section view of an exemplary crankcase upper portion, a crankshaft web, and a balancer shaft gear according to aspects of the inventions disclosed herein.

An exemplary balancer gear 13 may provide oil conduction to terminal parts of the crankshaft 5 (generator or power take off ends) without having to machine oil conduits in the crankshaft 5 itself, and may only require the crankshaft 5 and/or the web 5W be designed to receive oil through the balancer gear 13. Accordingly, an exemplary balancer gear 13 may be machined separately to provide an exemplary groove 15 and oil conduit 16 therein, while being designed to fit about crankshaft 5, to collectively create a more easily manufacturable system that allows for modularity and ease of replacement, if necessary. Furthermore, clogged grooves 15 and/or conduits 16 in such exemplary balancer gears 13 may allow for ease of servicing as only the gear 13 may be subjected to maintenance without full deconstruction and remediation of the crankshaft 5, which saves time and cost of such maintenance of the engine 10. An exemplary operative depiction of the provision of oil from a source 19 (e.g., an injector) through a crankcase conduit 18, which may be located in one or more of crankcase upper portion 1*a* and/or crankcase lower potion 1*b* about crankshaft 5, into a groove 15 in an exemplary balancer gear 13 for metered delivery of lubricant, e.g., oil, through conduit 16 to the most proximal crankshaft web 5W may be shown with reference to FIG. 6.

Figure 5:
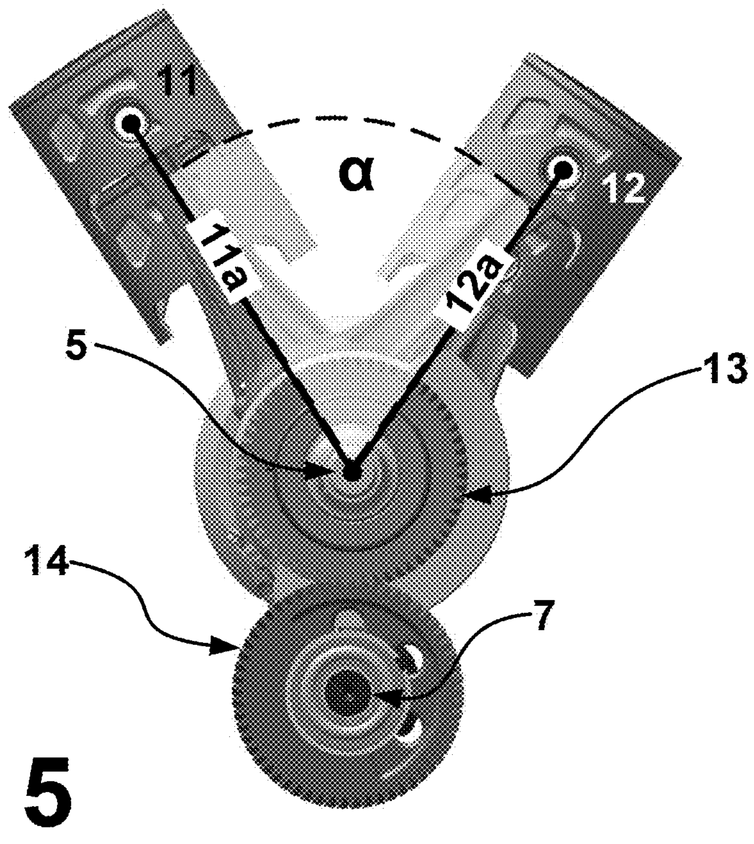
FIG. 5 illustrates an exemplary embodiment of a front-facing view of the crankshaft, pistons, con-rods, and balancer shaft of FIG. 4 according to aspects of the inventions disclosed herein.

Referring to the illustrative embodiment of FIG. 5, an illustrative engine 10 may contain within banks within cylinder blocks 2*a* and 2*b* (not shown) one or more pistons 11 and 12, respectively, each of which being configured to translate about paths 11*a* and 12*a*, respectively. Paths 11*a* and 12*a* may be similar to a line passing through the center of cylinders 11 and 12, respectively, and intercepting the longitudinal axis 5*a* of an exemplary crankshaft 5. In an exemplary embodiment, an angle α may represent the angular disposition of each cylinder 11 and 12 with respect to the other about longitudinal axis 5*a* of the crankshaft 5. In a preferred embodiment, angle α may be less than 90°, and in an even more preferred embodiment may be between 60° and 75°, and in still more preferred embodiment, may be about 67°.

Figure 7A:
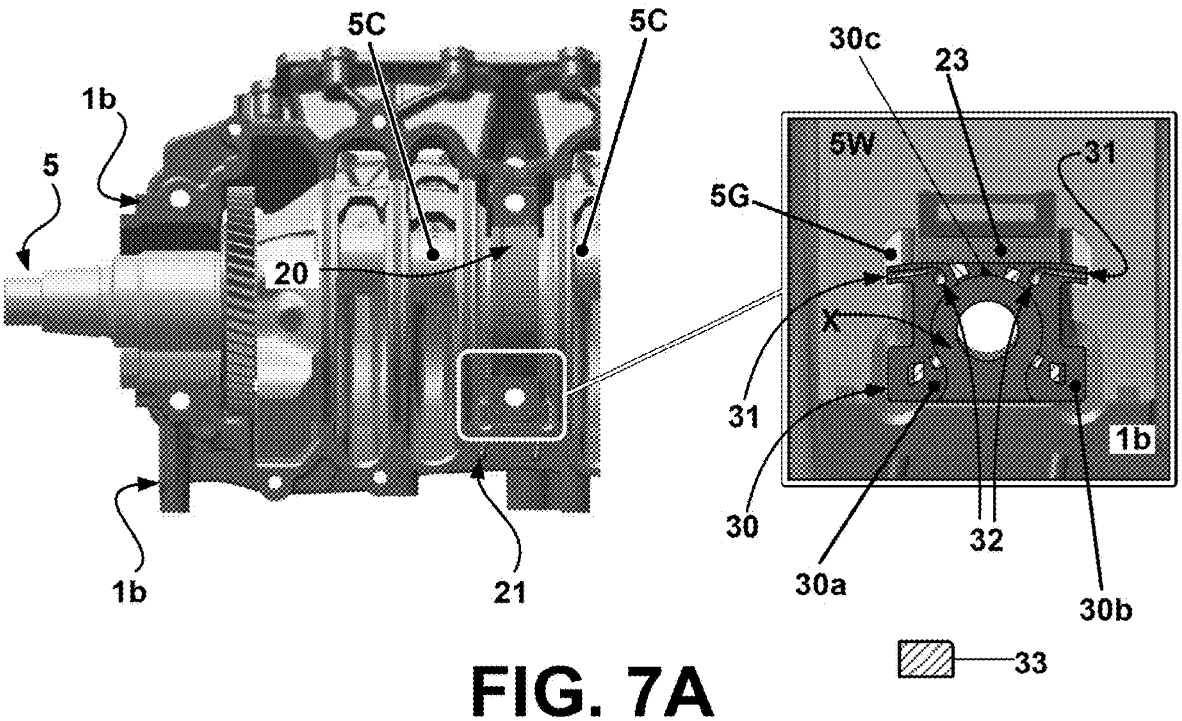
FIGS. 7A-B each illustrates an exemplary embodiment of a sectioned profile view of a crankcase lower portion, a portion of the crankshaft and crankshaft web, and a con rod lubrication insert according to aspects of the inventions disclosed herein.
Figure 7B:
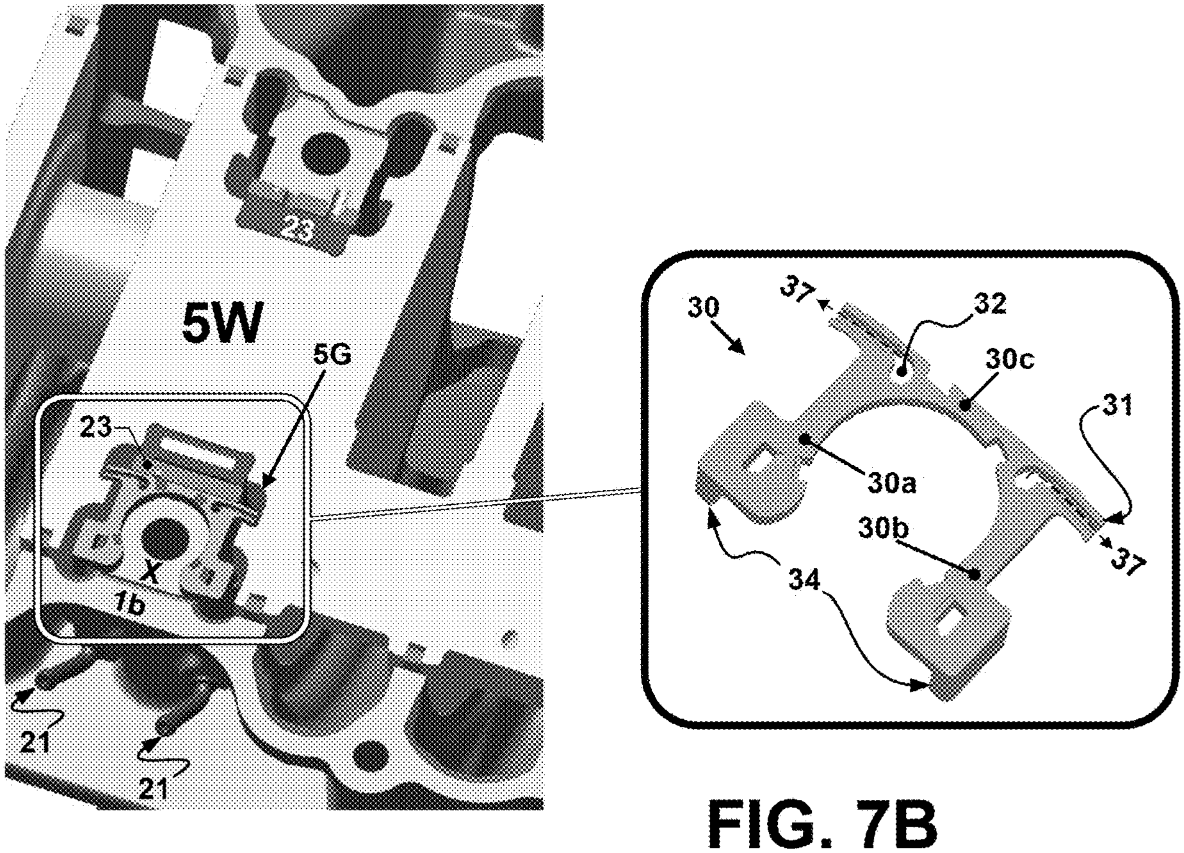

Referring now to the exemplary embodiment illustrated in FIGS. 7A-B, an exemplary generator side of an exemplary crankshaft 5 may be shown within crankcase lower portion 1*b*. As illustrated, a crankshaft journal 20 may be operatively disposed about crankshaft web 5W at a location proximal to con rod coupling portions 5C. As may be understood with reference to the crankshaft and bore systems disclosed in U.S. Pat. No. 8,757,028, which disclosures are incorporated herein by reference in their entirety, an exemplary crankshaft 5 may likewise contain pathways through the crankshaft web 5W for metering lubricant to the portions inward of the generator end, e.g., the con rod portions 5C and/or those portions of web 5W that are distal from balancer gear 13 and/or balancer shaft 7 rear bearing 14*b*, such as, for example, the journaled sections of the crankshaft 5 that allow for the adjacent rotary movement of the con rods of the pistons (e.g., pistons 11 and/or 12) within cylinder blocks 2*a* and/or 2*b*. It may also be contemplated that the disclosures herein may apply to unitary or forged crankshafts 5 and/or built crankshafts 5, that is crankshafts whose portions are assembled to one another as opposed to being integrally formed/forged.

Figure 8:
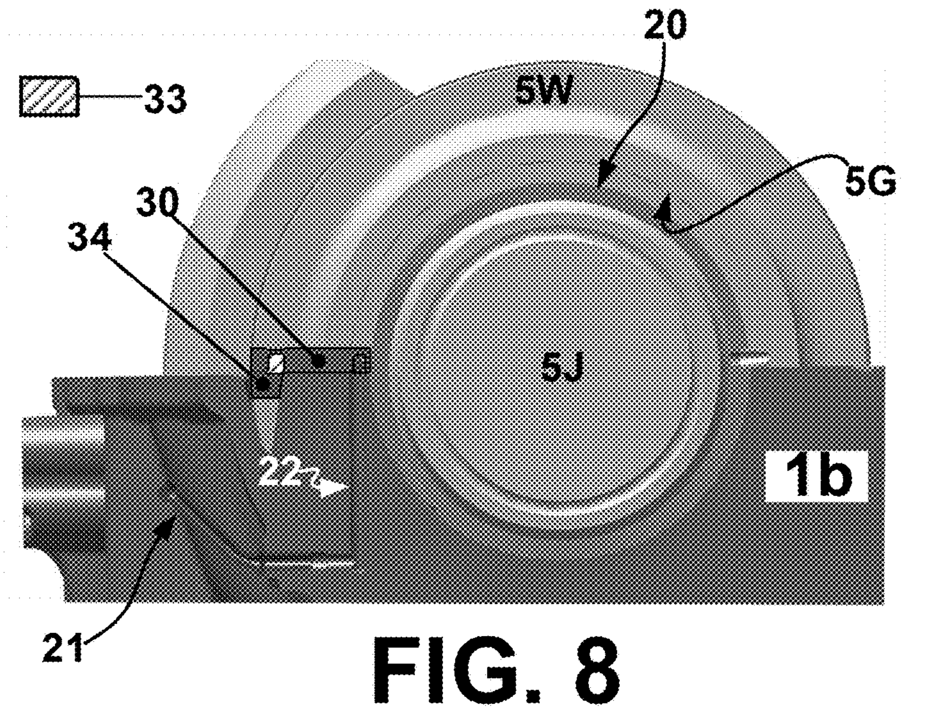
FIG. 8 illustrates an exemplary embodiment of another sectioned view of a crankcase lower portion, a portion of the crankshaft and crankshaft web, and a con rod lubrication insert according to other aspects of the inventions disclosed herein.
Figure 9A:
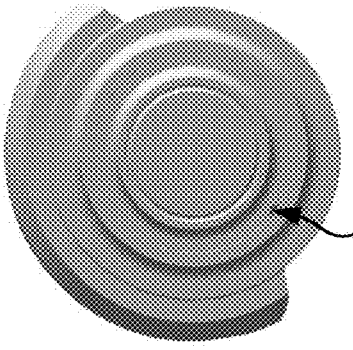
FIGS. 9A-B illustrates an exemplary embodiment of sectioned views of portions of the crankshaft, crankshaft web, and a con rod sections according to aspects of the inventions disclosed herein.
Figure 9B:
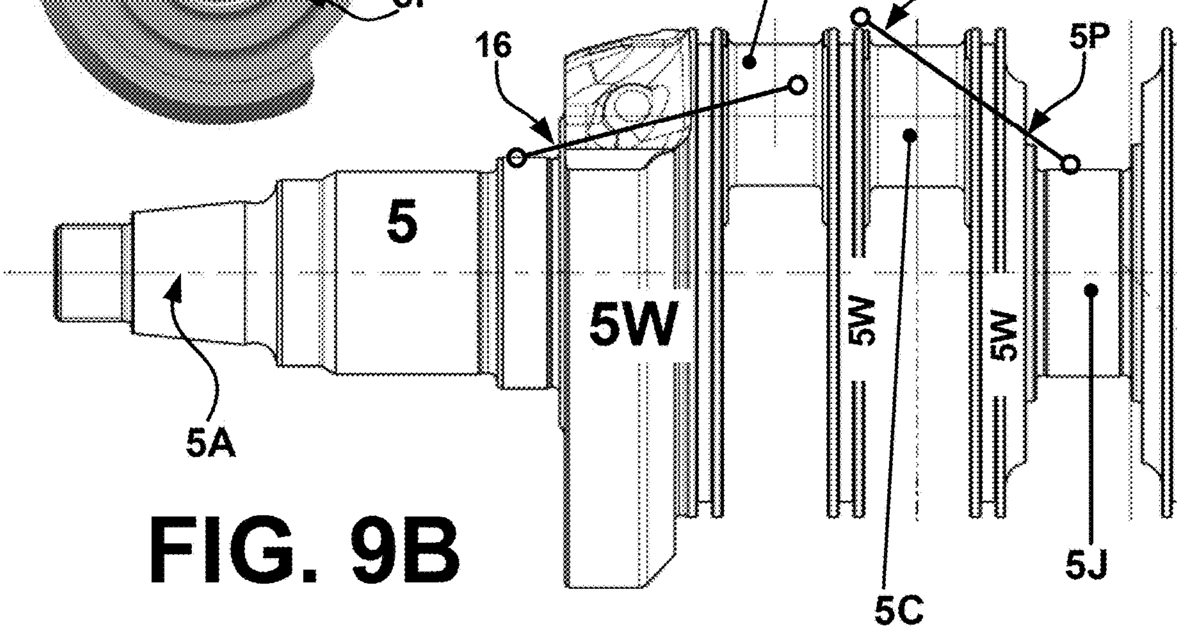

In typical crankshaft housings, internal conduits for lubricants to con rods may require expensive machining and, in the event of failure or other issues, result in time-intensive and costly remediation. Thus, in an exemplary embodiment, as illustrated in FIGS. 7A-B, an insert 30 may be used as a lubricant redirection bridge to communicate lubricant, such as oil, supplied radially into the crankshaft web 5W within its repository in crankcase portions (1*a* and/or 1*b*) from a lubrication inlet 21 via a channel 22 bored into the crankcase (e.g., in the illustrative embodiment of FIG. 8, channel 22 may be bored into crank case lower 1*b*). An exemplary insert 30 may communicate the lubrication it receives and induce it, using a nozzle effect in combination with other forces experienced within the engine 10 during operation, to pass the lubrication from its radially originating source within the crankcase portion in which it may be found 1*a*/1*b* (e.g., groove 5G from inlet 21 via channel 22) and urge it into a plane substantially parallel to longitudinal axis 5*a* of the crankshaft 5 so that it may travel through crankshaft 5 borings (such as those depicted by items 106(a), 106(b), 250, 316, 316(a), 316(b), 318, 320, 324(a), 324(b), 326, 328, and FIGS. 7(a)-(b) and 8(a)-(b) in U.S. Pat. No. 8,757,028, the disclosures of which are incorporated herein by reference in their entirety) to pass lubricant to the con rod retaining portions of crankshaft 5, namely sections 5C via outlet 5P (as illustrated in FIGS. 8A-B). While such crankshaft bores may be parallel with the crankshaft 5 axis through the web 5W and con rod sections 5C, as may be illustrated in U.S. Pat. No. 8,757,028, which such disclosures are incorporated herein, these bores may also be in planes that are at an angle to both the vertical plane and the horizontal plane that intersect about crankshaft 5 longitudinal axis 5*a*. In other words, an exemplary bore, e.g., a bore 18 may be at an angle that is at an angle to longitudinal axis 5A in a plurality of planes.

Referring back to the illustrative embodiments of FIGS. 7A-B, an exemplary insert 30 may be shown in an exploded view from within crankcase lower 1*b* and crankshaft 5. An exemplary insert 30 may be configured as an inverted arch-shaped structure having legs 30*a* and 30*b* interconnected by a torso 30*c* and disposed adjacent to the bearing 23 of the journaled section 5J of an exemplary crankshaft 5. In an exemplary embodiment, a pair of opposing nozzles 31 may extend outwardly from torso 30*c* in a direction substantially perpendicular to the extent of legs 30*a* and/or 30*b*. An exemplary insert 30 may also have a gasket 33 with portions extending around and through the thickness of insert 30, as may be illustrated with reference to the exploded view shown in FIGS. 7B-C and 10A. In an exemplary embodiment, an exemplary insert 30 may be disposed on a mechanical attachment feature X formed in or otherwise fabricated for the crankcase lower portion 1*b* (and/or crankcase portion 1*a* or other portions as the case may be). In a preferred embodiment, feature X is a part of lower portion 1*b* designed for coupling with other parts of vehicular engine 10. In other words, crankcase lower portion 1*b* may be coupled to the crankcase upper portion 1*a* in such a manner that may cause an exemplary insert 30 to be rigidly and/or frictionally contained therebetween to reduce and/or alleviate potential for movement during engine 10 use.

Referring to both FIGS. 7A-B, 8, and 9A-B, an exemplary insert 30 may operate within an exemplary engine 10 by channeling lubricant pumped through nozzles upstream of inlet 21 in crankcase portion 1*b* via a crankcase channel 22 into the passage 32 of insert 30. An exemplary passage 32 may be designed to reduce turbulence of the incoming lubricant and/or reduce the effects of its viscosity on the inside of insert 30. An exemplary passage 32 may be fluidly connected to nozzles 31 to allow for a substantial change in direction (e.g., about) 90° of the incoming lubricant from channel 22 toward its destination, e.g., groove 5G in crankshaft webbing 5W, and thereafter, via conduit 5P on web 5W and through bore 18, said lubricant may be passed through to the con rod pins 5C. In an exemplary embodiment, nozzles 31 may be configured to emit lubricant from inlet 21 in a metered fashion through catch groove 5G found along the intermediate crankshaft web portions 5W. Via an exemplary catch groove 5G, a conduit 5P through the crankshaft web 5W may permit lubricant to then engage the con rod section 5C disposed distally from an exemplary insert 30 location. In another exemplary embodiment, exemplary nozzles 31 may be disposed toward an acute corner of catch groove 5G to allow for expedited delivery through conduit 5P located in the crankshaft webbing 5W in which it may be found. Due to exemplary rotational velocities involved for an exemplary crankshaft 5, delivery of lubricant along the arc shown in dashed lines in FIG. 7B and into the acute radially distant corners of catch groove 5G as depicted in FIGS. 7A and 7B may allow the lubricant received therein to be pushed radially-outwardly by centrifugal forces and find its way to the conduit 5P and the bore 18 through the webbing 5G to ultimately reach the corresponding opening for bore 18 in the con rod section 5C. The disclosures herein may allow for lubricant provision in an exemplary engine 10 using a combination of pumps (e.g., through and to inlets 21) and the fluid dynamics induced by the configuration of the crankshaft 5 in collaboration with the flow redirection features of an exemplary insert 30 when disposed in the crankcase 1*a*/1*b*.

Figure 10A:
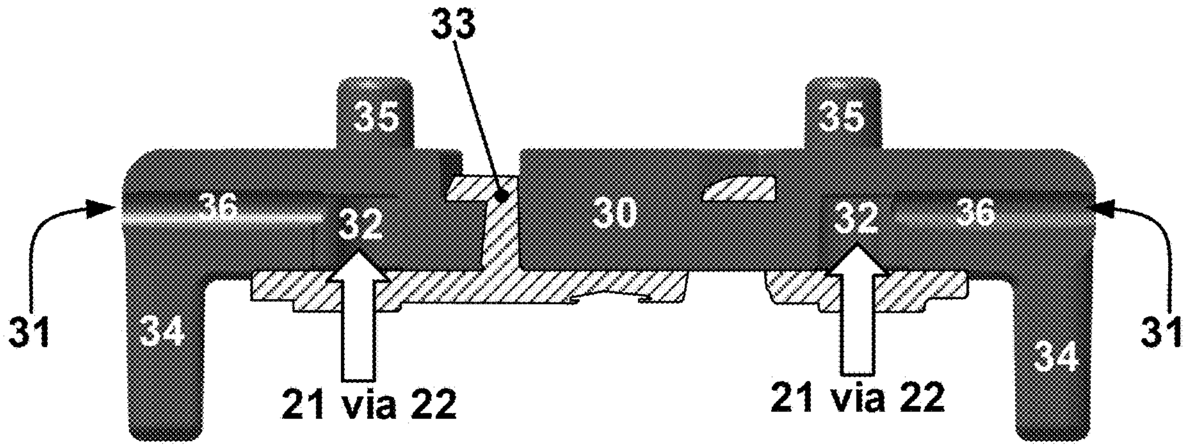
FIGS. 10A-B illustrate exemplary embodiments of a con rod lubrication insert and a con rod lubrication insert as it would be used in operation within an exemplary crankcase lower portion according to aspects of the inventions disclosed herein.
Figure 10B:
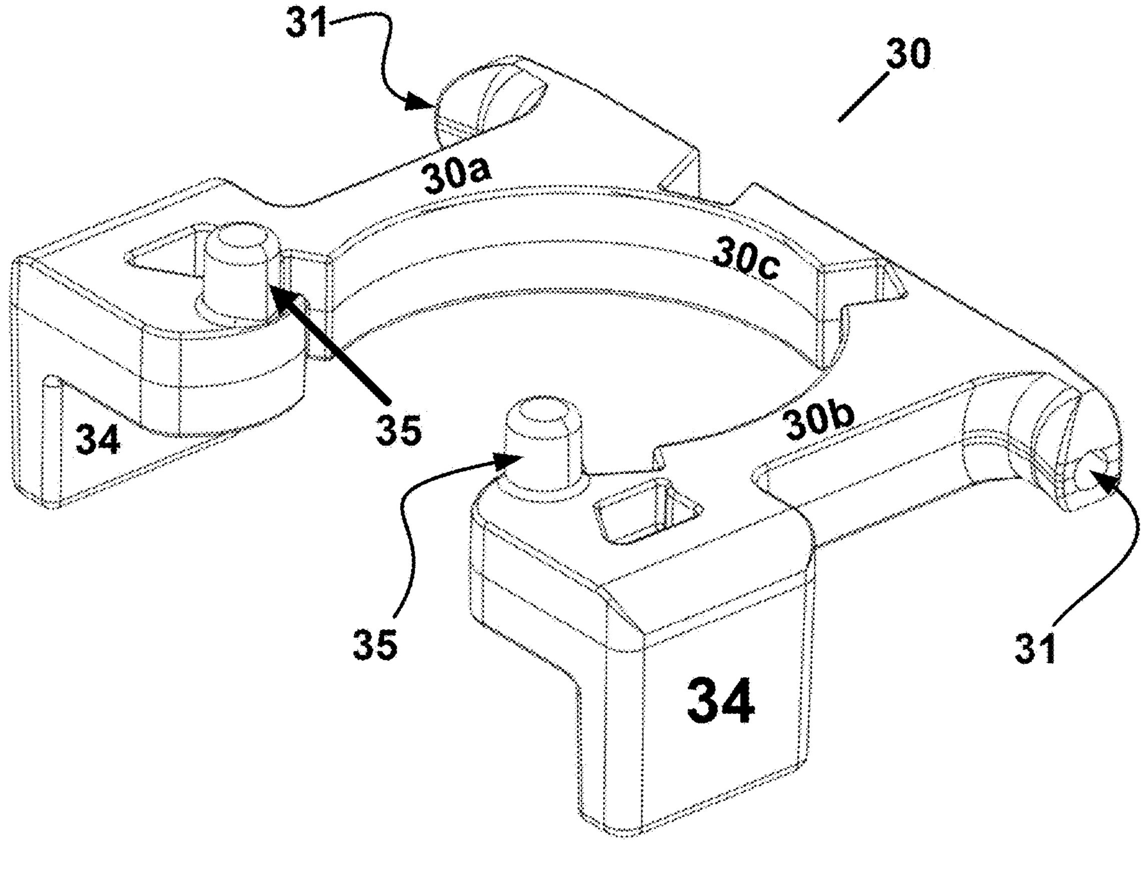

An exemplary insert 30, as may be viewed in FIGS. 7A and 10A-B, may also contain alignment feet 34 and adjustment pins 35 disposed outwardly from the plane in which nozzle 31 may be found. Exemplary alignment feet 34 may be used to more easily procure and replace an exemplary insert 30 for servicing of the same. Additionally, exemplary adjustment pins 35 may be used to accurately place an exemplary insert 30 within a particular portion of the crankcase lower 1*b* and/or upper 1*a*, as the case may be. While alignment feet 34 and adjustment pins 35 may be illustrated with particular geometries, those skilled in the art could design these fee 34 and pins 35 in any manner that accomplishes the purposes set forth above.

In an exemplary embodiment, an exemplary insert 30 may be made out of plastic, in particular, any heat-resistant and load-bearing plastic known to those skilled in the art. In a preferred embodiment, insert 30 may be made from a polyacrylic acid ("PA") or a polycarbonate ("PC"). Additionally, an exemplary gasket 33 may be made from any type of rubber or other elastomers that may be used to reduce shock, increase operation capacity, and/or resist high temperatures. In a preferred embodiment, gasket 33 may be made from a hydrogenated nitrile rubber ("HNBR"). While insert 30 may be made to snap-fit or frictionally couple with gasket 33, it may be contemplated that the two are integrally molded with one another, such as through over-molding, or that one is mechanically fastened to the other. In the former exemplary embodiment, an over-molded insert 30 and gasket 33 may have increased rigidity and resistance to vibratory loads caused by the operation of engine 10. An exemplary insert 30 may be manufactured in two halves and vibration welded together or otherwise adhered to one another using techniques known to those skilled in the art. Additionally, so long as an exemplary engine 10 provides an appropriately configured repository for an exemplary insert 30, a replacement exemplary insert 30 may be created using additive manufacturing techniques using known materials available to those skilled in the art.

Figure 11:
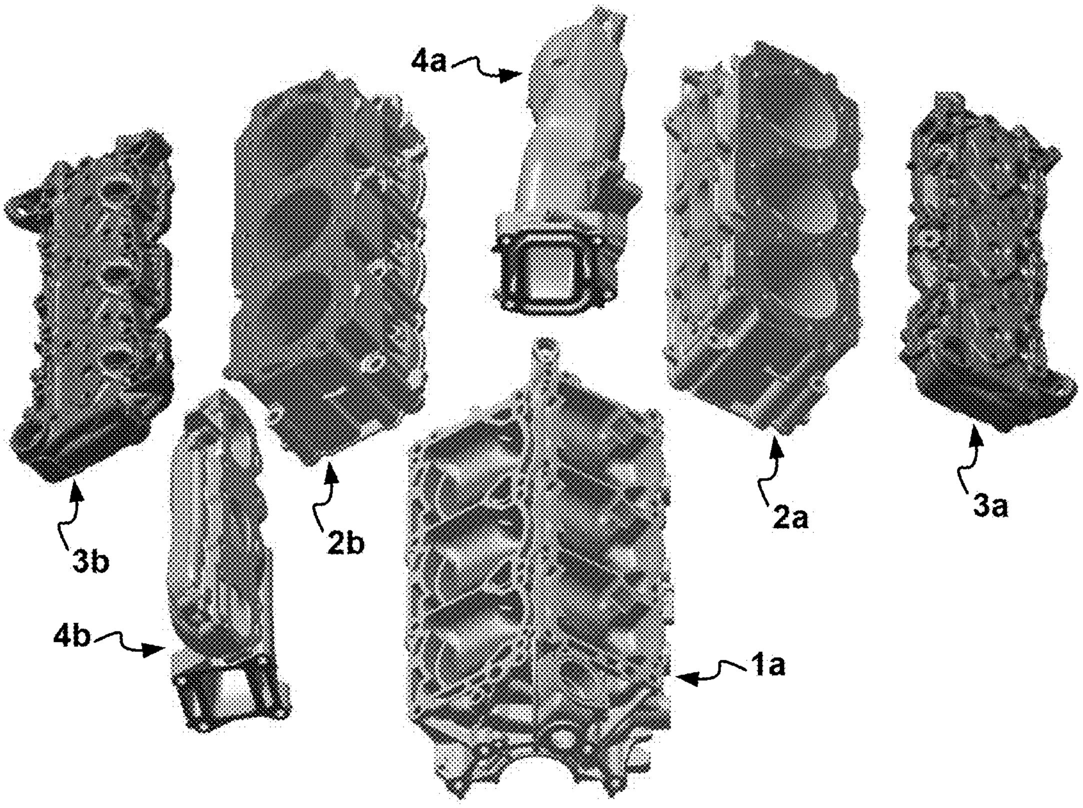
FIG. 11 illustrates an exemplary embodiment of an exploded view of an exemplary engine system according to still further aspects of the inventions disclosed herein.

Referring now to the exemplary embodiment illustrated by FIG. 11, an exemplary engine 10 may be shown with each of its constituent components, crankcase upper portion 1*a*, cylinder blocks 2*a* and 2*b*, cylinder heads 3*a* and 3*b*, and exhaust manifolds 4*a* and 4*b*, in exploded view. According to the exemplary embodiment of FIG. 11, and alternatively applicable to all other embodiments and illustrations provided herein, each of cylinder blocks 2*a* and 2*b* may be identical in construction such that either one can represent the same constructed part. In a preferred embodiment, cylinder blocks 2*a* and 2*b* may be machined in the same fashion without mirroring, and yet each would still allow for appropriate coupling between each cylinder head 3*a*/3*b* and/or exhaust manifold 4*a*/4*b*. In another preferred embodiment, exhaust manifolds 4*a* and 4*b* may be machined in the same fashion without mirroring. Thus, an exemplary engine 10 according to the embodiment illustrated in FIG. 11 may utilize a single crankcase upper portion 1*a* but place any of cylinder blocks 2*a*/2*b*, cylinder heads 3*a*/3*b*, and/or exhaust manifolds 4*a*/4*b* along planes 9*a* and 9*d* of upper portion 1*a* provided at least one of the exhaust manifolds 4*a*/4*b* may be disposed between the "V" formation of the cylinder blocks 2*a* and 2*b*.

Accordingly, an engine 10 of the type described may be used for a V-style engine such that only one mold of each component 2*a*/2*b*, 3*a*/3*b*, and 4*a*/4*b* need be made thereby reducing the manufacturing molds necessary to form a complete engine 10. Furthermore, an exemplary engine 10 that is made in a V-style configuration may also be rendered in an in-line 3 configuration using the same crankcase upper portion 1*a*, cylinder blocks 2*a*, cylinder head 3*a*, and exhaust manifold 4*a*. In this manner, the modularity illustrated and described with respect to FIG. 11 and its applicable disclosures to all other embodiments, increases efficiency of engine 10 creation and reduces the number of components involved in manufacturing a V-style engine and an inline style engine on assembly lines.

The vehicular engine 10 may be used in a variety of different types of vehicles, including, but not limited to, marine vehicles (e.g., boats) as one of an inboard or one of an outboard engine (including multiple engines aligned side-to-side), recreational vehicles (snowmobiles, all-terrain vehicles, side-by-side, personal watercraft), and other on-road vehicles such as motorcycles, scooters, and automobiles. Compliance with the disclosures contained herein may provide additional advantages for marine vehicle engine arrangements where such vehicular engines may be placed side-by-side and space is limited. Therefore, compliance with such disclosures may enable a more efficient arrangement of the vehicular engines used on a marine vehicle and optimize both power, frame size, and overall marine vehicle balance. While such disclosures provide the aforementioned benefits on a marine vehicle, it is contemplated that any other vehicles would obtain the same and/or selective combinations of such benefits and others from following these disclosures.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A vehicular V-type engine, comprising:

a crankshaft operably mounted in a crankcase, the crankshaft being configured to rotate about a longitudinal crankshaft axis;

a balancer shaft operably coupled to the crankshaft and disposed below the crankshaft, the balancer shaft having an axis of rotation; and a plurality of pistons coupled to the crankshaft, wherein each piston is coupled to the crankshaft via a con rod and each piston is configured to translate along a radial axis extending perpendicularly from the longitudinal crankshaft axis to enable the vehicular V-type engine to generate power, wherein the radial axis for a first piston of the plurality of pistons lies in a first plane and the radial axis for a second piston of the plurality of pistons lies in a second plane, wherein an angle $\alpha$ formed between the first plane and the second plane is less than 90° and more than 0°, wherein a third plane substantially bisects the angle $\alpha$, the third plane comprising each of the axis of rotation of the balancer shaft and the longitudinal crankshaft axis, the axis of rotation of the balancer shaft being spaced apart from the longitudinal crankshaft axis;

further comprising:

a balancer cover disposed below a lower portion of the crankcase and operably coupled thereto;

a balancer gear separable from and operably coupled to the crankshaft and a front gear coupled to the balancer shaft, the balancer gear comprising:

a front surface most distal from a center of the crankshaft;

a rear surface most proximal to the center of the crankshaft, a thickness connecting the front surface to the rear surface;

a catch groove in the front surface; and a passage from the catch groove and through the thickness of the balancer gear, wherein the passage opens toward a surface on a web of the crankshaft, wherein the balancer gear and the front gear engage one another.

2. The vehicular V-type engine of claim 1, wherein the angle α is less than 75°.

3. The vehicular V-type engine of claim 2, wherein the angle α is about 67°.

4. The vehicular V-type engine of claim 1, further comprising at least one cylinder block for translation of at least one of the plurality of pistons along the first plane and at least one cylinder block for translation of at least one of the plurality of pistons along the second plane, wherein each at least one cylinder block is coupled to an upper portion of the crankcase above the longitudinal crankshaft axis.

5. The vehicular V-type engine of claim 4, further comprising an exhaust manifold.

6. The vehicular V-type engine of claim 5, wherein the exhaust manifold is disposed at an angle substantially equal to the angle α.

7. The vehicular V-type engine of claim 6, further comprising an air plenum coupled to the crankcase.

8. The vehicular V-type engine of claim 7, wherein each of the air plenum and the exhaust manifold extends outwardly from the longitudinal crankshaft axis by a substantially equal distance.

9. The vehicular V-type engine of claim 8, further comprising a second exhaust manifold disposed in a space in which the angle α is formed between the first plane and the second plane and operatively coupled to the vehicular V-type engine.

10. The vehicular V-type engine of claim 9, wherein a center of gravity for the vehicular V-type engine is proximal to the third plane.

11. The vehicular V-type engine of claim 5, further comprising an air plenum coupled to the crankcase.

12. The vehicular V-type engine of claim 11, wherein each of the air plenum and the exhaust manifold extends outwardly from the longitudinal crankshaft axis by a substantially equal distance.

13. The vehicular V-type engine of claim 1, further comprising a balancer cover disposed below a lower portion of the crankcase and operably coupled thereto.

14. The vehicular V-type engine of claim 13, further comprising a balancer gear separable from and operably coupled to the crankshaft and a front gear coupled to the balancer shaft, wherein the balancer gear and the front gear engage one another.

15. The vehicular V-type engine of claim 14, wherein a lubricant is supplied to a portion of the crankshaft most proximal to the balancer gear via a groove in and a passage through the balancer gear.

16. The vehicular V-type engine of claim 5, wherein each cylinder block and corresponding cylinder head is identical in construction.

* * * * *